Nov. 8, 1955     E. R. THOMPSON     2,722,948
INSIDE LINE DUCT
Filed Oct. 29, 1953     2 Sheets-Sheet 1
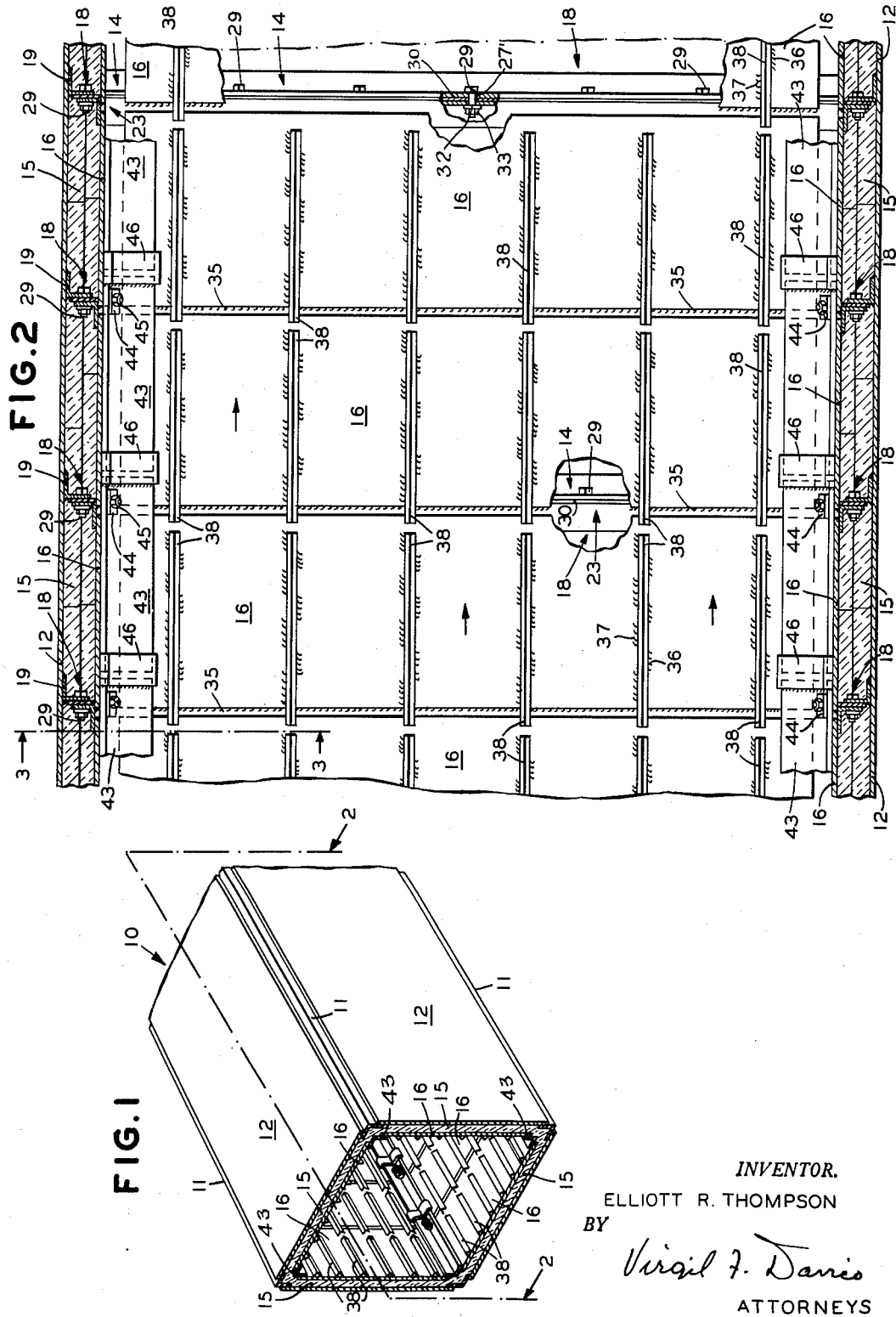
INVENTOR.
ELLIOTT R. THOMPSON
BY
Virgil F. Davies
ATTORNEYS Nov. 8, 1955     E. R. THOMPSON     2,722,948
INSIDE LINE DUCT
Filed Oct. 29, 1953     2 Sheets-Sheet 2
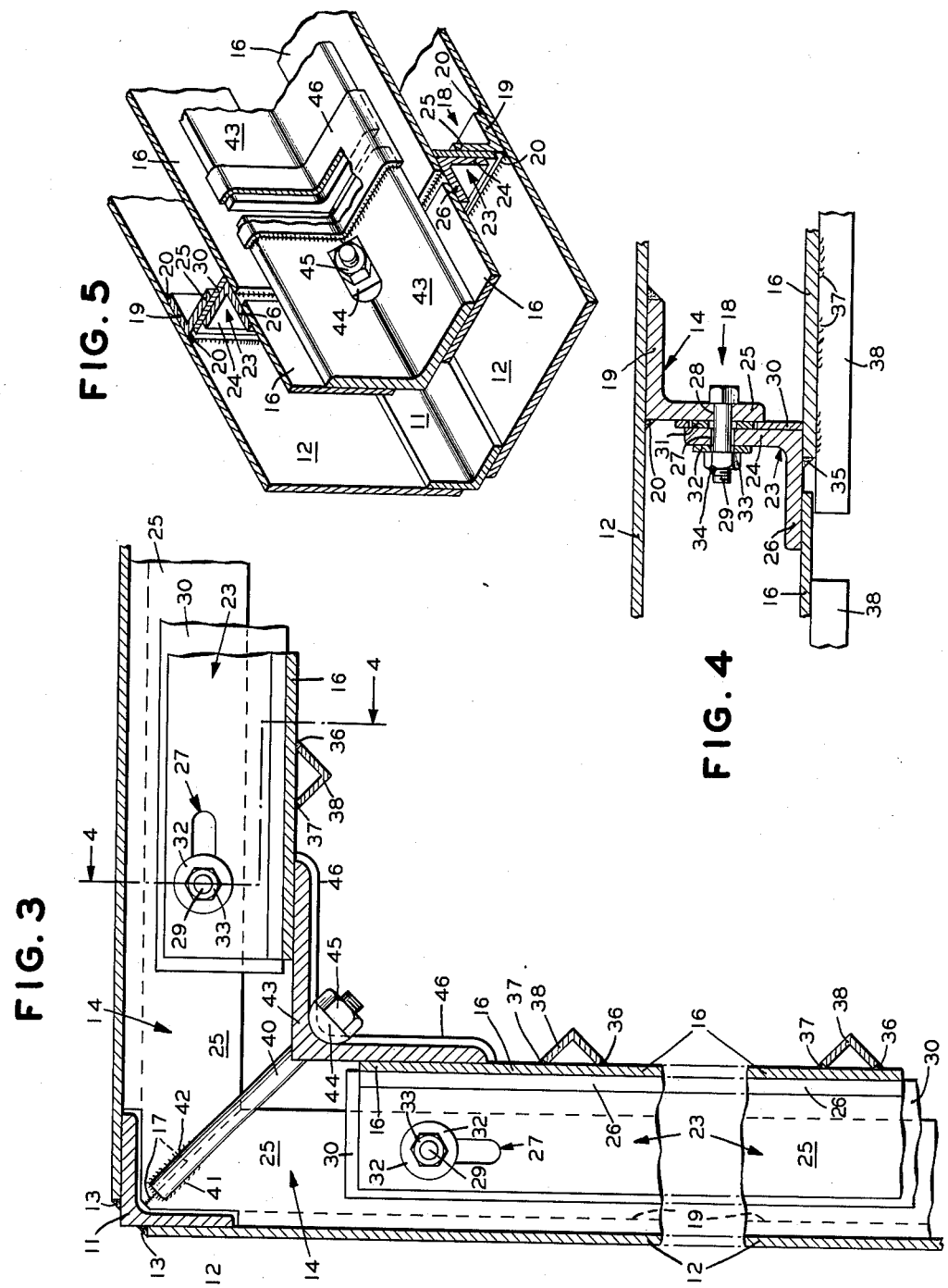
INVENTOR.
ELLIOTT R. THOMPSON
BY
ATTORNEYS

United States Patent Office 2,722,948
Patented Nov. 8, 1955

2,722,948

INSIDE LINE DUCT

Elliott R. Thompson, Princeton Township, Mercer County, N. J., assignor to The M. W. Kellogg Company, Jersey City, N. J., a corporation of Delaware Application October 29, 1953, Serial No. 388,939

16 Claims. (Cl. 138—64)

This invention relates to insulation liners for ducts, and the like, employed in handling air or other gases at elevated temperature and particularly to insulation liners for large noncircular ducts of this type.

Ducts, and the like, which handle air or other gases at elevated temperature are at times lined with slabs, or brick-like blocks, of insulation material which in service are directly contacted by the air or gas handled. This expedient is satisfactory so long as the gas flow rates are low and the gas does not entrain substantial quantities of solid material so that erosion of the insulation material is not a serious consideration. At high flow rates and especially where there is substantial entrainment of solids, this expedient is not economically practical as the insulation material wears away too rapidly. The only practical solution under these conditions is to interpose a metal liner between the insulation material and the flowing gases. When the ducts are circular in cross section or although they are noncircular in cross section, they are small; it is a comparatively simple matter to provide an effective metal shield for the insulation material. When the ducts are of noncircular cross section and are large in size, the provision of an effective metal shield for the insulation material presents an extremely difficult problem as the shields for such large noncircular ducts involve large flat panels of comparatively light gauge metal whose expansion and contraction characteristics are unpredictable by reason of locked in stresses, metal flow lines, etc., developed in the metal of the panels during manufacture thereof. When such panels are designed in accordance with the practice of the prior art, it is practically impossible to keep such panels flat and in their intended shielding position in use, unless extremely complicated and expensive support arrangements are provided.

It is a principal object of this invention to provide an insulation lining for large noncircular ducts which includes a metal liner or shield for the insulation material so supported and arranged that it is free to expand and contract with temperature changes while it is maintained flat and in position to retain and shield the insulation material.

It is also a principal object of this invention to provide an insulation lining for large noncircular ducts and conduits which includes a metal liner or shield for the insulation material, said insulation lining being of cheap and simple construction, easy to erect in new as well as in old installations and being formed of parts of such size and weight that they may be easily and conveniently shipped.

The further objects, features and advantages of the invention will become apparent from a consideration of the following detailed description of a present preferred embodiment of the invention taken with the accompanying drawings, in which:

Fig. 1 is an isometric, partly sectional view of a conduit incorporating the insulation lining of the invention;

Fig. 2 is a sectional view taken in the plane 2—2 of Fig. 1;

Fig. 3 is an enlarged sectional view taken along line 3—3 of Fig. 2;

Fig. 4 is a sectional view taken along line 4—4 of Fig. 3; and

Fig. 5 is an isometric, partly sectional, view better illustrating the corner construction of the conduit of Figs. 1–3.

The insulation lining of the invention is of general application and may be used to advantage in connection with ducts of large noncircular construction such as are employed in handling gases at elevated temperatures in dryers, ovens, furnaces, etc. Such ducts are generally rectangular, hence, the invention will be more particularly described in connection with the rectangular duct 10 of Fig. 1 which is used in a steam power plant to lead flue gases from a furnace to an economizer. By way of example, to indicate what is meant by large ducts, and not by way of limitation, the duct 10 is some 22 feet wide, 7 feet high and 11 feet long.

The duct 10 includes at each corner thereof a longitudinal structural angle 11 which runs the full length of the duct 10. The metal panels 12 form the outer casing of the duct 10 and each panel 12 has its longitudinal edges united to a respective pair of the angles 11 by means of the continuous welds 13. The panels 12 are comparatively thin, for instance, the duct 10 above dimensioned by way of example, is provided with panels 12 which are in the order of 3/16 of an inch thick, and are each in the form of a single length, whether formed from a single sheet or from a plurality of separate sheets welded together into a unit in any preferred way. To each panel 12 are attached the spaced structural angles 14 transversely disposed. The angles 14 are equally spaced apart along the length of each panel 12 by a distance about equal to the length of a pair of slabs of insulation material 15, whose length is determined by the longitudinal dimension of the metal liner panels 16. The angles 14 of the respective panels 12 are aligned so that each longitudinal group thereof occurs in substantially the same plane. The end portions of the angles 14 are mitered and contiguous end portions are united as by the welds 17 to incorporate each longitudinal group of the angles 14 into a rectangular unitary ring-like supporting structure 18 of great strength and stability. The welds 17 are deposited only on the downstream side of the angles 14 to permit the placing of bolts, hereinafter more particularly referred to, on the upstream side of the angles 14. The angles 14 have their legs 19 pointing downstream and positioned on the respective panel 12. The legs 19 are united to their respective panels 12 by spaced stitch welds 20 which are staggered on opposite sides of the legs 19.

Cooperating with each angle 14 is a transverse structural angle 23 which carries the liner panel 16. The angles 23 are oppositely disposed relative to their respective angles 14. Each angle 23 has a leg 24 disposed contiguous to the leg 25 of its respective angle 14 and another leg 26 pointing upstream and parallel to the leg 19. The legs 24 have a plurality of perforations 27 formed therein along their length. The spacing of the perforations 27 is such that one of them is located at the middle of the leg 24. The middle perforation, perforation 27', is circular, whereas the other perforations 27 are in the form of elongated slots. The leg 25 is similarly perforated to provide perforations 28 aligned with the perforations 27 and 27'. The perforations 28 may all be circular or the middle one may be circular and the others slot-like. In any event, the length of the slot-like perforations 27 is such to provide for guided but unrestricted expansion and contraction movements of the leg 24 relative to the middle of the leg 25 due to thermal causes. A thickness of asbestos board 30 is interposed between the legs 24 and 25 to separate said legs by a heat barrier and thus reduce to a minimum the transfer of heat therebetween. The legs 24 and 25 at each pair of aligned perforations 27 and 28 or 27' and 28, are also spaced apart by means of a metal washer 31 which is slightly thicker than the asbestos board 30 so that in the relative movements of the legs 24 and 25 due to thermal causes, the asbestos board 30 will not be subject to excessive wear. A bolt 29 is passed through each pair of perforations 27 and 28 or 28 and 27', and after having a washer 32 placed on its threaded, extending shank, has a nut 33 threaded thereon. This construction is shown on an enlarged scale in Fig. 4 in connection with a pair of aligned perforations 27 and 28. A paper shim of about 0.010 inch in thickness is first interposed between the washer 32 and the nut 33 and then nut 33 is tightened. The nut 33 is fixed in position on the shank of the bolt 29 by the tack weld 34. In use, the paper shim soon disintegrates to thus permit a predetermined expansion and contraction movement of the parts without undue binding thereof. By reason of the arrangement just described, angle 23 is free to expand and contract longitudinally from the central point defined at the bolt 29 in central perforation 27', the other bolts 29 maintain the spatial relationship of the legs 24 and 25 and thus serve to guide the leg 24 in the relative movements. These other bolts 29 do not restrain the expansion and contraction movements of the leg 24 and thus do not impose conditions which lend to the warping of the angle 23.

To each leg 26 of the angle 23 and adjacent the downstream end thereof, is united the upstream transverse edge of a respective liner panel 16 as by means of the weld 35. The upstream transverse edge of the liner panel 16 is so positioned relative to the downstream edge of the leg 26 to which it is attached, that the major portion of said leg 26 is exposed and provides a guiding and bearing surface for guiding without restraint, the downstream end of the next adjacent upstream liner panel 16 in its longitudinal movements toward and away from its respective weld 35 due to thermal effects. By this arrangement each panel liner section 16 is restrained only at its upstream transverse edge so that guided unrestrained expansion and contraction movements are provided for and even the restrained edge is free to expand and contract back and forth transversely from its middle with the angle 23 as the angle 23 is anchored at its midpoint only. Each liner panel 16, which is of a thickness approximating that of the panels 12, may be formed out of a single sheet or out of a plurality of small sheets welded together, but in any event, the panel 16 acts as a continuous panel mechanically. To restrain the panels 16 from warping movement out of their original plane, each panel 16 has welded thereto by means of the staggered stitch welds 36 and 37, a plurality of spaced stiffening angles 38. These stiffening angles 38 extend beyond the upstream end of their respective liner panel 16 and override the next upstream panel 16 so that they serve as guides and retain the upstream end of said downstream panel 16 against the respective leg 26 and guide said upstream end in both its longitudinal and transverse expansion and contraction movements.

Each angle ring structure 18 carries at each corner thereof and located on the respective diagonal thereof, a fastening stud 40. The stud 40 overlies the weld 17, which is deposited only on the downstream side of the angles 14 to facilitate the placing of the stud 40 on the upstream side of said angles 14, and is attached to the angles 14 by fillet welds 41 and 42 at the outer unthreaded end thereof. The inner threaded end of the stud 40 passes through a corner structural angle 43 which is adapted to overlie and bear on the contiguous longitudinal edges of the adjacent liner panels 16 to guide the movements of said longitudinal edges and to seal the corners of duct 10 to access by the heated medium conducted through the duct 10. The threaded shank of the stud 40 passes through a bearing piece 44 which is conveniently formed from a piece of half round bar. The nut 45 is threaded on the threaded end of the stud 40 and serves to tighten the seal angle assembly to the desired degree. The welds 41 and 42 are quite short and at the outer ends of the studs 40 to facilitate alignment, by bending if necessary, with the holes in the corner angle 43 during installation. Being attached at their unthreaded ends only, the studs 40 are placed on the upstream side of the angles 14 to gain reinforcement from the angles 14 for resisting, and for controlling, the direction of expansion of the corner angles 43.

The sealing angle 43 is preferably provided in a plurality of sections approximately equal to the length of the liner panels 16 and each section is held in position by a single stud 40 adjacent its downstream end. As shown, the sections of the corner seal angles 43 are spaced from each other to provide for the necessary elongation and contraction movements due to thermal effects. To seal the joint between the seal angle sections against entrance of the heated gas conducted in the duct 10, a lap strip 46 is welded to the downstream end of each section of the corner seal angle 43 and overlies the upstream end of the adjacent downstream section.

The spaces between the panels 12, the liner panels 16 and the angles 14 and 23 are filled by slabs of insulation 15. The insulation slabs 15 may be of any convenient material, but at present block type mineral wool insulation is preferred. Instead of a single block for each space as just defined, four blocks are preferably employed. It will be noted that diagonally opposite blocks have similar cross-sectional shapes so while four styles of blocks are actually employed, all are made from the same blank cross-sectional size but rabbeted differently to clear the various legs of the angles 14 and 23. The insulation blocks 15 are placed in position prior to the welding of the panels 16 to the angles 23.

The construction described provides a liner which is made up of panels of such a length as to be easily handled in their manufacture, in shipping to the point of assembly, and in assembly at the point of use. These panels, however, are such as they can freely expand and contract and yet are restrained against warping and deformation which would make the insulation accessible to the flow gases.

While the invention has been described with particular reference to a specific embodiment, it is to be understood that it is not to be limited thereto, but is to be construed broadly and restricted solely by the scope of the appended claims.

I claim:

1. A conduit adapted for use with gaseous media at elevated temperatures, including an elongated, multi-sided outer shell, each side a subtantially flat panel, inwardly extending members attached to each of said panels and straddling the longitudinal center line of the respective panel, said extending members substantially equi-spaced along the length of the respective panel, a supporting member attached to each of said extending members adjacent the center line of the respective panel, said supporting members transversely disposed relative to the respective center lines, each of said supporting members including a surface substantially parallel to the respective panel, a rectangular sheet on the surfaces of each pair of adjacent supporting members covering the space therebetween with one end fixedly attached to one supporting member of said pair and the other end free to move on the surface of the other supporting member of said pair, means for maintaining said free end in bearing relation on the surface of said other supporting member, and insulation in the space between said panels and said sheets.

2. A conduit adapted for use with gaseous media at elevated temperatures, including an elongated, multi-sided outer shell, each side a substantially flat panel, inwardly extending members attached to each of said panels and straddling the longitudinal center line of the respective panel, said extending members substantially equi-spaced along the length of the respective panel, a supporting member attached to each of said extending members adjacent the center line of the respective panel, said supporting members transversely disposed relative to the respective center lines, means restraining each of said supporting members against other than longitudinal movement towards and away from its respective point of attachment due to contraction and expansion, each of said supporting members including a surface substantially parallel to the respective panel, a rectangular sheet on the surfaces of each pair of adjacent supporting members covering the space therebetween with one end fixedly attached to one supporting member of said pair and the other end free to move on the surface of the other supporting member of said pair, means for maintaining said free end in bearing relation on the surface of said other supporting member, and insulation in the space between said panels and said sheets.

3. A conduit adapted for use with gaseous media at elevated temperatures, including an elongated, multi-sided outer shell, each side a substantially flat panel, inwardly extending members attached to each of said panels and straddling the longitudinal center line of the respective panel, said extending member substantially equi-spaced along the length of the respective panel, a supporting member attached to each of said extending members adjacent the center line of the respective panel, said supporting members transversely disposed relative to the respective center lines, each of said supporting members including a surface substantially parallel to the respective panel, a flat rectangular sheet on the surfaces of each pair of adjacent reinforcing members covering the space therebetween with one end of the sheet fixedly attached to one supporting member of said pair and the other end of the sheet free to move on the surface of the other supporting member of said pair, means for maintaining said free end in bearing relation on the surface of said other supporting member, means restraining said sheet against deformation out of the flat condition during expansion and contraction thereof, and insulation in the space between said panels and said sheets.

4. A conduit adapted for use with gaseous media at elevated temperatures, including an elongated, multi-sided outer shell, each side a substantially flat panel, inwardly extending members attached to each of said panels and straddling the longitudinal center line of the respective panel, said extending members substantially equi-spaced along the length of the respective panel, a supporting member attached to each of said extending members adjacent the center line of the respective panel, said supporting members transversely disposed relative to the respective center lines, means restraining each of said supporting members against other than longitudinal movement towards and away from its respective point of attachment due to contraction and expansion, each of said supporting members including a surface substantially parallel to the respective panel, a flat rectangular sheet on the surfaces of each pair of adjacent supporting members covering the space therebetween with one end of the sheet fixedly attached to one supporting member of said pair and the other end of the sheet free to move on the surface of the other supporting member of said pair, means for restraining said sheets from deformation out of the flat condition during expansion and contraction thereof, means for maintaining said free end in bearing relation in the surface of said other supporting member, means at each corner of the conduit adapted to bear on adjacent longitudinal edges of said sheets to maintain said adjacent edges in predetermined position during expansion and contraction of said sheets, and insulation in the space between said panels and said sheets.

5. A conduit as defined in claim 1, in which heat barrier means are provided between said extending members and said supporting members.

6. A conduit as defined in claim 1, in which said extending members are disposed transversely relative to their respective panels, extend from one longitudinal edge of the respective panel to the other longitudinal edge, and are located in groups equi-spaced along the length of the conduit, the contiguous edges of adjacent extending members being joined together to form each group into a ring-like structure that serves as reinforcement for the conduit.

7. A conduit adapted for use with gaseous media at elevated temperatures, comprising an elongated rectangular outer shell having a side in the form of a flat panel, a structural member disposed transversely of and straddling the longitudinal center line of said panel, said structural member united to said panel as reinforcement thereto and including an inwardly extending web, a second structural member disposed parallel to said first structural member and of a length approaching the width of said panel, means uniting said second structural member to said web at substantially said center line, said second structural member including a web disposed substantially parallel to the surface of said panel, a flat rectangular sheet forming a transverse zone of the inner wall of said conduit, said sheet having a transverse end mounted on said latter web with the contiguous edge united to said latter web, means restraining the movement of the other edges of said sheet due to expansion and contraction of said sheet to maintain the flat condition of said sheet, and insulation in the space between said panel and said sheet.

8. A conduit adapted for use with gaseous media at elevated temperatures, comprising an elongated rectangular outer shell having a side in the form of a flat panel, a structural member disposed transversely of and straddling the longitudinal center line of said panel, said structural member united to said panel as reinforcement thereto, said structural member including an inwardly extending web, a second structural member disposed parallel to said first structural member and of a length approaching the width of said panel, means uniting said second structural member to said web at substantially said center line, said second structural member including a web disposed substantially parallel to the surface of said panel, a flat rectangular sheet forming a transverse zone of the inner wall of said conduit, said sheet having a transverse end mounted on said latter web with the contiguous edge united to said latter web, means restraining the expansion and contraction movements of the other edges of said sheet to maintain said edges in substantially a fixed plane, means united to said sheet transversely disposed relative to said structural members restraining said sheet against warping and twisting during expansion and contraction of said sheet, and insulation in the space between said panel and said sheet.

9. A conduit adapted for use with gaseous media at elevated temperatures, comprising an elongated rectangular outer shell having a side in the form of a flat panel, a structural member disposed transversely of and straddling the longitudinal center line of said panel, said structural member united to said panel as reinforcement thereto and including an inwardly extending web, a second structural member disposed parallel to said first structural member and of a length approaching the width of said panel, means uniting said second structural member to said web at substantially said center line, means engaging said web and said second structural member restraining said second structural member in its expansion and contraction movements to maintain parallelism between said structural members, said second structural member including a web substantially parallel to the surface of said panel, a rectangular sheet forming a transverse zone of the inner wall of said conduit, said sheet having a transverse end mounted on said latter web with the contiguous edge united thereto, means restraining the expansion and contraction movements of the other edges of said sheet to maintain said other edges in a substantially fixed plane, and insulation between said panel and said sheet.

10. A conduit adapted for use with gaseous media at elevated temperatures, comprising an elongated rectangular outer shell having a side in the form of a flat panel, a structural angle member disposed transversely of and straddling the longitudinal center line of said panel, said angle member having a web united to said panel as reinforcement, the other web extending inwardly, a second structural angle member disposed parallel to said first angle member, and including a web contiguous to said extending web and a web presenting a surface substantially parallel to the surface of said panel, bolt means uniting said extending web and said contiguous web at said center line to provide a fixed anchorage for said contiguous web from which it expands outwardly and toward which it contracts inwardly, means engaging said extending web and said contiguous web preventing relative transverse movement of said webs but permitting relative longitudinal movements thereof, a rectangular sheet forming a transverse zone of the inner wall of said conduit, said sheet having a transverse end mounted on said surface with the contiguous edge united thereto, means restraining the expansion and contraction movement of the other edges of said sheet to maintain said other edges in a substantially fixed plane, and insulation in the space between said panels and said sheets.

11. A conduit adapted for use with gaseous media at elevated temperatures, comprising an elongated rectangular outer shell having a side in the form of a flat panel, a structural angle member disposed transversely of and straddling the longitudinal center line of said panel, said angle member having a web united to said panel as reinforcement, the other web extending inwardly, a second structural angle member disposed parallel to said first angle member, said second angle member including a web contiguous to said extending web and a web presenting a surface substantially parallel to the surface of said panel, bolt means uniting said extending web and said contiguous web at said center line to provide a fixed anchorage for said contiguous web from which it expands outwardly and towards which it contracts inwardly, means engaging said extending web and said contiguous web preventing relative transverse movement of said webs but permitting relative longitudinal movements thereof, a heat barrier between said extending and said contiguous webs, a rectangular sheet forming a transverse zone of the inner wall of said conduit, said sheet having a transverse end mounted on said surface with the contiguous edge united thereto, means restraining the expansion and contraction movement of the other edges of said sheet to maintain said other edges in a substantially fixed plane, and insulation in the space between said panel and said sheet.

12. A conduit adapted for use with gaseous media at elevated temperatures, comprising an elongated rectangular outer shell having a side in the form of a flat panel, a structural member disposed transversely of and straddling the longitudinal center line of said panel, said structural member united to said panel as reinforcement thereto and including an inwardly extending web, a second structural member disposed parallel to said first structural member, means uniting said second structural member to said web at substantially said center line, means engaging said web and said second structural member restraining said second structural member in its expansion and contraction movements to maintain parallelism between said structural members, said second structural member including a web substantially parallel to the surface of said panel, a rectangular sheet forming a transverse zone of the inner wall of said conduit and having a transverse end mounted on said web with the contiguous edge united thereto, a plurality of angle members spaced along the length of said sheet with the edges of both of the respective webs thereof on said sheet and united to said sheet to restrain said sheet against warping and twisting movements, means restraining the expansion and contraction movements of the other edges of said sheet to maintain said other edges in a substantially fixed plane, and insulation in the space between said panel and said sheet.

13. A conduit adapted for use with gaseous media at elevated temperatures, comprising an elongated rectangular outer shell having a side in the form of a flat panel, a plurality of parallel structural members equispaced along the length of said panel and disposed transversely of and straddling the longitudinal center line of said panel, means anchoring each of said structural members to said panel and at the center line thereof for free expansion and contraction about said center line, means restraining each of said structural members against nonlongitudinal movement during expansion and contraction thereof, each of said structural members including a web substantially parallel to the surface of said panel, a rectangular sheet spanning the space between each pair of adjacent structural members to form a respective transverse zone of the inner wall of said conduit and having its transverse ends positioned on the webs of the respective pair of structural members, one of said ends having its edge united to and positioned adjacent the edge of its respective web, the other of said ends having its edge positioned intermediate the edges of its web to provide sufficient bearing surfaces for the movement of said other end due to expansion and contraction of said sheet, means maintaining said other end in contact with said bearing surface during expansion and contraction movements of said sheet, and insulation in the spaces between said sheets and said panel.

14. A conduit adapted for use with gaseous media at elevated temperatures, comprising an elongated rectangular outer shell having a side in the form of a flat panel, a plurality of parallel structural members equispaced along the length of said panel and disposed transversely of and straddling the longitudinal center line of said panel, means anchoring each of said structural members to said panel and at the center line thereof for free expansion and contraction about said center line, means restraining each of said structural members against nonlongitudinal movement during expansion and contraction thereof, each of said structural members including a web substantially parallel to the surface of said panel, a rectangular sheet spanning the space between each pair of adjacent structural members to form a respective transverse zone of the inner wall of said conduit and having its transverse ends positioned on the webs of the respective pair of structural members, one of said ends having its edge united to and adjacent the edge of its respective web, the other of said ends having its edge positioned intermediate the edges of its web to provide sufficient bearing surface for the movement of said other end due to expansion and contraction of said sheet, a plurality of angle members spaced along the length of each of said sheets with the edges of both of the respective webs of each angle member on said sheet and united to said sheet to restrain said sheet against warping and twisting movements, said angle members terminating short of the floating end of said sheet and extending sufficiently beyond the anchored end of said sheet to provide a guide for maintaining the floating end of the adjacent sheet in contact with its respective bearing surface during the movement thereof due to expansion and contraction, and insulation in the spaces between said sheets and said panel.

15. A conduit adapted for use with gaseous media at elevated temperatures, comprising an elongated rectangular shell having sides in the form of flat panels, reinforcing angle members disposed transversely on and united to each of said side panels, said angle members in the same plane and contiguous ends thereof united to form a ring-like reinforcing structure, a sheet supporting angle member carried by each of said reinforcing angle members for unrestrained longitudinal expansion and contraction, a rectangular sheet defining a transverse zone of the inner wall of said conduit positioned on each of said sheet supporting angles with a transverse edge thereof positioned on and united to the web of the respective supporting angle, a guiding angle member at each corner of the conduit and inward of said inner wall sheets adapted to cover the longitudinal ends of the pair of inner wall sheets at the respective corner to seal said corner to the medium handled in the conduit and to guide said longitudinal ends in their expansion and contraction movements, means connected to the corners of said ring-like structure supporting the guiding angle members and for free expansion and contraction thereof, and insulation between said sheets and said panels.

16. A conduit adapted for use with gaseous media at elevated temperatures, comprising an elongated rectangular outer shell having sides in the form of flat panels, a reinforcing angle member disposed transversely of and united to each of said panels, said members in the same plane and contiguous ends thereof united to form a ring-like structure reinforcing said shell, a sheet supporting angle member carried by each of said reinforcing angle members for unrestrained longitudinal expansion and contraction, a rectangular sheet defining a transverse zone of the inner wall of said conduit positioned on each of said sheet supporting angles with a transverse edge thereof positioned on and united to the web of the respective supporting angle, a guiding angle member at each corner of the conduit and inward of said inner wall sheets adapted to cover the longitudinal ends of a pair of wall sheets at the respective corner to seal said corner to the medium handled in the conduit and to guide said longitudinal ends for their expansion and contraction movements, a plurality of said reinforcing ring and supported sheet structures spaced along the length of said conduit to provide substantially continuous inner walls therefor, said guiding angle members each formed in a plurality of lengths each approximating the longitudinal length of said wall sheets, means united to said ring-like structure at the corners thereof supporting said guiding angle members at one end thereof to permit independent expansion and contraction of said guiding members, and insulation between said sheets and said panels.

References Cited in the file of this patent

UNITED STATES PATENTS

| 2,423,213 | Weber | July 1, 1947 |
| 2,451,146 | Baker et al. | Oct. 12, 1948 |
| 2,599,210 | Thompson | June 3, 1952 |